(12) United States Patent
Ying et al.

(10) Patent No.: US 10,702,776 B2
(45) Date of Patent: Jul. 7, 2020

(54) INFORMATION PROCESSING METHOD, STORAGE MEDIUM AND ELECTRONIC DEVICE

(71) Applicant: NETEASE (HANGZHOU) NETWORK CO., LTD., Hangzhou (CN)

(72) Inventors: Lun Ying, Hangzhou (CN); Chao Ding, Hangzhou (CN)

(73) Assignee: NETEASE (HANGZHOU) NETWORK CO., LTD., Hangzhou, Zhejiang (CN)

( * ) Notice: Subject to any disclaimer, the term of this patent is extended or adjusted under 35 U.S.C. 154(b) by 71 days.

(21) Appl. No.: 16/168,968

(22) Filed: Oct. 24, 2018

(65) Prior Publication Data

US 2019/0118089 A1   Apr. 25, 2019

(30) Foreign Application Priority Data

Oct. 25, 2017   (CN) .......................... 2017 1 1009747

(51) Int. Cl.
*A63F 13/53* (2014.01)
*A63F 13/2145* (2014.01)
(Continued)

(52) U.S. Cl.
CPC .......... *A63F 13/53* (2014.09); *A63F 13/2145* (2014.09); *A63F 13/537* (2014.09);
(Continued)

(58) Field of Classification Search
None
See application file for complete search history.

(56) References Cited

U.S. PATENT DOCUMENTS 9,004,997 B1 * 4/2015 Prosin ................... A63F 13/837
                                                              463/2
9,033,797 B1   5/2015 Karpiuk et al.
(Continued)

FOREIGN PATENT DOCUMENTS

CN   103076972 A   5/2013
CN   104548596 A   4/2015
(Continued)

OTHER PUBLICATIONS

The CN 1OA dated Aug 20, 2018 by CNIPA.
(Continued)

*Primary Examiner* — Tramar Y Harper
(74) *Attorney, Agent, or Firm* — Yunling Ren

(57) ABSTRACT

The present disclosure provides an information processing method and apparatus, a storage medium, and an electronic device. The method includes: providing a crosshair for aiming at a virtual target and a crosshair control region on a graphical user interface, the crosshair control region being configured to control a movement of the crosshair according to a detected sliding touch event; when it is detected that a preset trigger condition is satisfied, determining whether the sliding touch event occurs in the crosshair control region; when the sliding touch event occurs in the crosshair control region, controlling the movement of the crosshair according to the detected sliding touch event; and when the sliding touch event does not occur in the crosshair control region, controlling the movement of the crosshair according to the deflection angle of the mobile device.

21 Claims, 5 Drawing Sheets

(51) Int. Cl.
*A63F 13/837* (2014.01)
*A63F 13/537* (2014.01)
*A63F 13/422* (2014.01)
*A63F 13/285* (2014.01)

(52) U.S. Cl.
CPC .......... *A63F 13/837* (2014.09); *A63F 13/285* (2014.09); *A63F 13/422* (2014.09)

(56) References Cited

U.S. PATENT DOCUMENTS

| | | | | |
|---|---|---|---|---|
| 2002/0082079 | A1* | 6/2002 | Mantyjarvi | A63F 13/10 463/30 |
| 2004/0029640 | A1* | 2/2004 | Masuyama | A63F 13/428 463/43 |
| 2007/0021210 | A1* | 1/2007 | Tachibana | A63F 13/02 463/37 |
| 2009/0181770 | A1* | 7/2009 | Viner | A63F 13/10 463/37 |
| 2010/0279768 | A1* | 11/2010 | Huang | A63F 13/216 463/31 |
| 2012/0004017 | A1* | 1/2012 | Sakurai | A63F 13/5258 463/2 |
| 2013/0217498 | A1* | 8/2013 | Wang | A63F 13/837 463/37 |
| 2013/0288790 | A1* | 10/2013 | Wang | A63F 13/06 463/31 |
| 2014/0243058 | A1* | 8/2014 | Tsuchiya | A63F 13/2145 463/2 |
| 2014/0274239 | A1* | 9/2014 | Han | A63F 13/00 463/2 |
| 2016/0107080 | A1* | 4/2016 | Miyamoto | A63F 13/211 463/31 |
| 2016/0129344 | A1* | 5/2016 | Shiina | A63F 13/30 463/36 |
| 2019/0030431 | A1* | 1/2019 | Zhang | A63F 13/5378 |
| 2019/0060767 | A1* | 2/2019 | Shao | A63F 13/2145 |

FOREIGN PATENT DOCUMENTS

| | | | |
|---|---|---|---|
| CN | 105148520 | A | 12/2015 |
| CN | 105498213 | A | 4/2016 |
| CN | 105582670 | A | 5/2016 |
| CN | 105597310 | A | 5/2016 |
| CN | 105688409 | A * | 6/2016 |
| JP | 2012239762 | A | 12/2012 |
| JP | 5337919 | B1 | 11/2013 |
| JP | 2016059554 | A | 4/2016 |
| JP | 2017021466 | A | 1/2017 |

OTHER PUBLICATIONS

"The appeal of sports hunting with the Gyrosessor".
"Review the settings and fight in the best condition!".
The JP1OA dated Nov. 12, 2019 by the JPO.

* cited by examiner

INFORMATION PROCESSING METHOD, STORAGE MEDIUM AND ELECTRONIC DEVICE

CROSS REFERENCE

This application is based upon and claims priority to Chinese Patent Application No. 201711009747.3, filed on Oct. 25, 2017, the entire contents thereof are incorporated herein by reference.

TECHNICAL FIELD

The present disclosure relates to the field of games, and more particularly, to an information processing method, a storage medium, and an electronic device.

BACKGROUND

Under the tide of Internet, the continuous development and evolution of hardware and software technologies have promoted the emergence of smart devices and software. Meanwhile, a large number of mobile games with different themes have been emerged to meet the needs of users.

For a mobile terminal running the mobile games, a player usually manipulates virtual characters in the game by touching a touch screen with thumbs of two hands. For games that include shooting, it is necessary to adjust a crosshair to aim at a shooting target. To facilitate the player to perform aiming operations on the mobile terminal, such as the mobile phone, a certain aiming assistance is provided usually. In the related arts, a range is placed at the crosshair or target. When the target enters the range of the crosshair or the crosshair enters the range of the range of the target, the crosshair is automatically aligned to a center of the target at a certain speed, follows the target to move, and disengages from the target when the target has moved for fixed time. According to the assisted aiming method provided in the related arts, the player lacks a sense of self-operation, and cannot accurately aim the crosshair to a certain exact position of the target, so that the user experience is poor.

It should be noted that the information disclosed in the above background section is only for enhancement of understanding the background of the present disclosure and therefore can include other information that does not form the prior art that is already known to those of ordinary skills in the art.

SUMMARY

The present disclosure aims at providing an information processing method and apparatus, a storage medium, and an electronic device.

According to an aspect of the present disclosure, there is provided an information processing method, applied to a mobile device capable of presenting a graphical user interface, the mobile device including a touch display screen and a sensor capable of detecting a deflection angle of a mobile device, a content displayed on the graphical user interface at least partially including a game scene, and the game scene including at least one virtual target, wherein the method includes:

providing a crosshair for aiming at the virtual target and a crosshair control region on the graphical user interface, the crosshair control region being configured to control a movement of the crosshair according to a detected sliding touch event;

when it is detected that a preset trigger condition is satisfied, determining whether the sliding touch event occurs in the crosshair control region;

when the sliding touch event occurs in the crosshair control region, controlling the movement of the crosshair according to the detected sliding touch event; and when the sliding touch event does not occur in the crosshair control region, controlling the movement of the crosshair according to the deflection angle of the mobile device.

According to another aspect of the present disclosure, there is provided an information processing apparatus, applied to a mobile device capable of presenting a graphical user interface, the mobile device including a touch display screen and a sensor capable of detecting a deflection angle of a mobile device, a content displayed on the graphical user interface at least partially including a game scene, and the game scene including at least one virtual target, wherein the apparatus includes:

a first control unit configured to provide a crosshair for aiming at the virtual target and a crosshair control region on the graphical user interface, the crosshair control region being configured to control a movement of the crosshair according to a detected sliding touch event;

a second control unit configured to, when it is detected that a preset trigger condition is satisfied, determine whether the sliding touch event occurs in the crosshair control region;

a third control unit configured to, when the sliding touch event occurs in the crosshair control region, control the movement of the crosshair according to the detected sliding touch event; and a fourth control unit configured to, when the sliding touch event does not occur in the crosshair control region, control the movement of the crosshair according to the deflection angle of the mobile device.

According to another aspect of the present disclosure, there is provided a computer readable storage medium storing a computer program thereon, wherein the computer program is executed by a processor to implement any of the above-mentioned information processing method.

According to another aspect of the present disclosure, there is provided an electronic device, including:

a processor, and a display unit; and a memory for storing executable instructions of the processor;

wherein, the processor is configured to execute any of the above information processing method via executing the executable instructions.

According to the information processing method provided by the exemplary embodiments of the present disclosure, by detecting whether the preset trigger condition is satisfied, and when it is detected that the preset trigger condition is satisfied, determining whether the sliding touch event occurs in the crosshair control region; when the sliding touch event occurs in the crosshair control region, controlling the movement of the crosshair according to the detected sliding touch event; and when the sliding touch event does not occur in the crosshair control region, controlling the movement of the crosshair according to a deflection angle of the mobile device, a player not only can actively adjust the crosshair to align to the target, but also can accurately aim at a certain exact position of the target during controlling the crosshair, which gives the player an opportunity to choose different aiming modes according to situations, thereby increasing a sense of operation of the player, solving the technical problem of being hard to balance operating autonomy and accuracy of the player in the assisted aiming process, and effectively improving the user experience.

BRIEF DESCRIPTION OF THE DRAWINGS

By describing the exemplary embodiments in detail with reference to the drawings, the above and other features and advantages of the present disclosure will become more apparent. Obviously, the drawings in the following description merely relate to some embodiments of the present disclosure, and based on these drawings, those of ordinary skills in the art may obtain other drawings without going through any creative effort. In the drawings.

DETAILED DESCRIPTION

It should be noted that, in case of no conflict, the embodiments in the present application and the features in the embodiments may be combined with each other. The present disclosure will be explained in detail with reference to the accompanying drawings and embodiments hereinafter.

To make those skilled in the art to better understand the solutions of the present disclosure, the technical solutions in the embodiments of the present disclosure will be clearly and completely described hereinafter with reference to the drawings in the embodiments of the present disclosure. It is apparent that the described embodiments are merely some, rather than all embodiments of the present disclosure. Based on the embodiments of the present disclosure, all other embodiments obtained by those of ordinary skills in the art without going through any creative work shall fall within the scope of protection of the present disclosure.

It should be noted that the terms "first", "second" and the like in the description and claims of the present disclosure as well as the above drawings are used to distinguish similar objects, and are not necessarily used to describe a specific sequence or a chronological order. It should be understood that the data used in this way can be interchanged where appropriate to facilitate the embodiments of the present disclosure described herein. In addition, the terms "include" and "have" and any deformation thereof are intended to cover a non-exclusive inclusion, for example, a process, method, system, product, or device that includes a series of steps or units is not necessarily limited to those steps or units that are explicitly listed, but may include other steps or units that are not explicitly listed or inherent to such process, method, product or device.

It should also be noted that various trigger events disclosed in this specification may be preset, and different trigger events may trigger execution of different functions.

Figure 1:
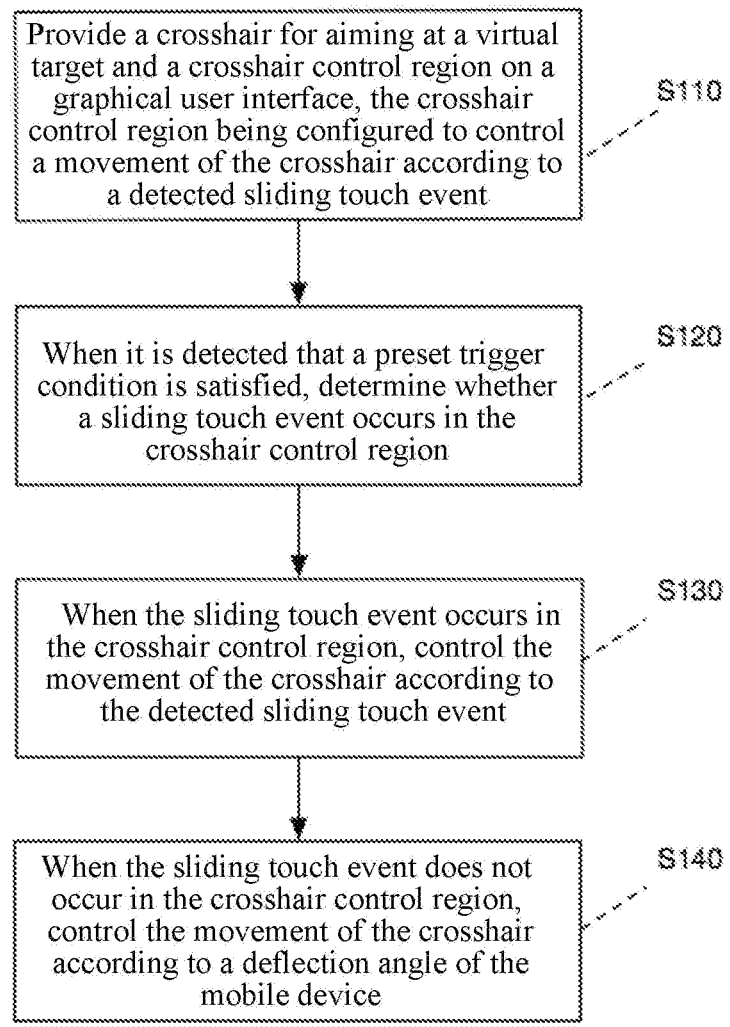
FIG. 1 is a flow chart of an information processing method according to an embodiment of the present disclosure.

An embodiment of the present disclosure provides an information processing method, applied to a mobile device capable of presenting a graphical user interface, the mobile device including a touch display screen and a sensor capable of detecting a deflection angle of a mobile device, a content displayed on the graphical user interface at least partially including a game scene, and the game scene including at least one virtual target. FIG. 1 is a flow chart of an information processing method according to an embodiment of the present disclosure. As shown in FIG. 1, the method in the embodiment includes the following steps:

In step S110, a crosshair for aiming at the virtual target and a crosshair control region are provided on the graphical user interface, the crosshair control region being configured to control a movement of the crosshair according to a detected sliding touch event.

In step S120, when it is detected that a preset trigger condition is satisfied, whether the sliding touch event occurs in the crosshair control region is determined.

In step S130, when the sliding touch event occurs in the crosshair control region, the movement of the crosshair is controlled according to the detected sliding touch event.

In step S140, when the sliding touch event does not occur in the crosshair control region, the movement of the crosshair is controlled according to the deflection angle of the mobile device.

According to the information processing method provided in the exemplary embodiment of the present disclosure, by detecting whether the preset trigger condition is satisfied, and when it is detected that the preset trigger condition is satisfied, determining whether the sliding touch event occurs in the crosshair control region; when the sliding touch event occurs in the crosshair control region, controlling the movement of the crosshair according to the detected sliding touch event; and when the sliding touch event does not occur in the crosshair control region, controlling the movement of the crosshair according to the deflection angle of the mobile device, a player not only can actively adjust the crosshair to align to the target, but also can accurately aim at a certain exact position of the target during controlling the crosshair, which gives the player an opportunity to choose different aiming modes according to situations, thereby increasing a sense of operation of the player, solving the technical problem of being hard to balance operating autonomy and accuracy of the player in the assisted aiming process, and effectively improving the user experience.

Each step of the information processing method in the exemplary embodiment will be further described hereinafter.

The sensor capable of detecting the deflection angle of the mobile device may be a gyroscope or an acceleration sensor in the mobile device, and may be used to detect angle information of the mobile device relative to a three-dimensional coordinate axis, and the movement of the crosshair is adjusted according to the angle information.

Figure 3:
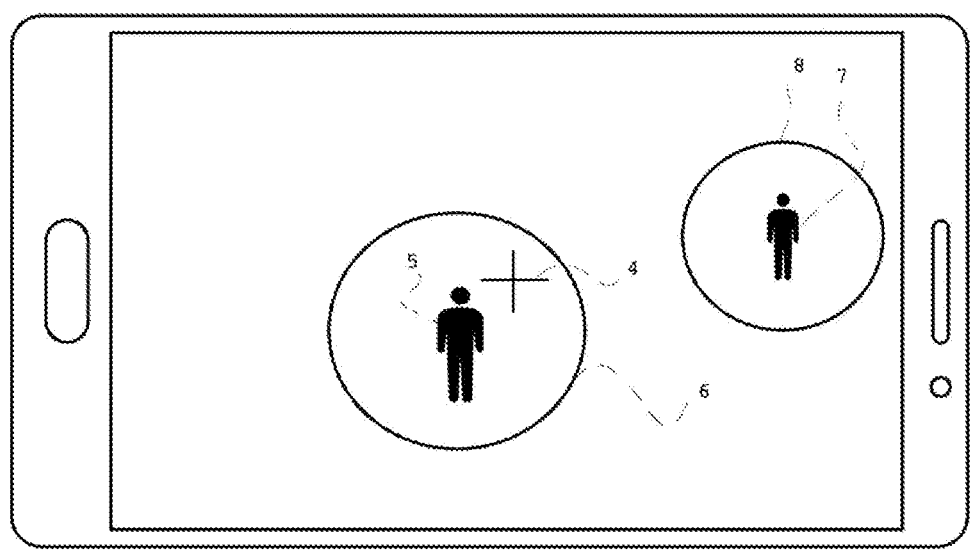
FIG. 3 is a schematic diagram of a graphical user interface in an exemplary embodiment of the present disclosure.

In step S110, a crosshair for aiming at the virtual target and a crosshair control region are provided on the graphical user interface, the crosshair control region being configured to control a movement of the crosshair according to a detected sliding touch event. The crosshair control region may be a right half of the graphical user interface, a part of the graphical user interface or the entire graphical user interface, i.e., the player may control the movement of the crosshair by sliding fingers on the right half of the touch display screen, a part of the screen or the entire screen, which will be not particularly limited in the exemplary embodiment. It should be noted that the crosshair is generally fixed at a specific position on the screen (for example, as shown in FIG. 3, a crosshair 4 is located at a center of the screen), and adjusting the crosshair is to adjust a game view. Although the position of the crosshair remains unchanged on the screen, the adjustment of the crosshair will cause a change in the game view, thus causing the crosshair to move in the game scene, so that the crosshair aims at the shooting target.

In step S120, when it is detected that a preset trigger condition is satisfied, it is determined whether the sliding touch event occurs in the crosshair control region. This step is used to, when the function of controlling the crosshair by rotating the mobile device is enabled, determine whether the player intends to control the crosshair by sliding the screen or to control the crosshair by rotating the mobile device. If the sliding touch event exists in the crosshair control region, then step S130 is executed to control a movement of the crosshair according to the sliding touch event; and if the preset trigger condition is satisfied, and the sliding touch event does not exist in the crosshair control region, then step S140 is executed to control the movement of the crosshair according to the rotation of the mobile device. It should be noted that, regardless of whether the preset trigger condition is satisfied (that is, whether the function of controlling the crosshair by rotating the mobile device is enabled or not), as long as the sliding touch event exists in the crosshair control region, the movement of the crosshair will be controlled according to the sliding touch event. The satisfaction of the preset trigger condition means that there is one more way for the player to control the crosshair in this state.

Figure 4:
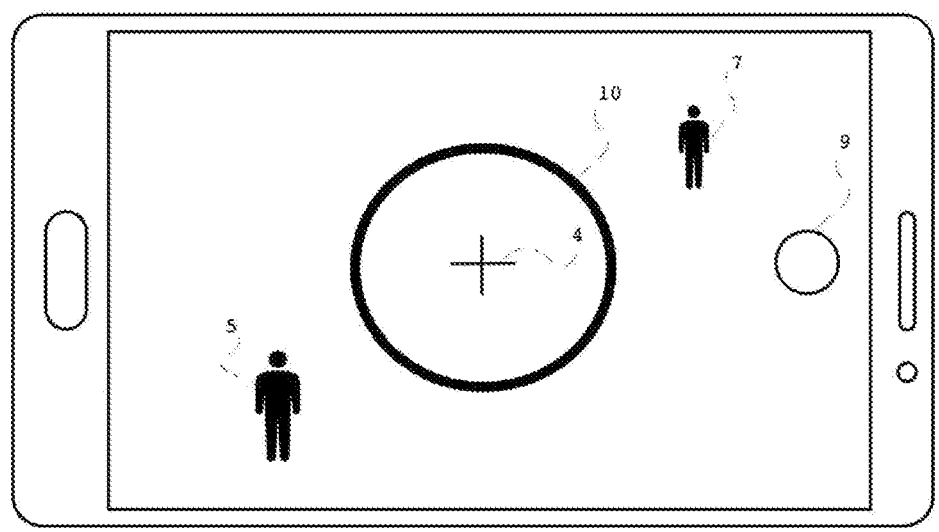
FIG. 4 is a schematic diagram of a graphical user interface in another exemplary embodiment of the present disclosure.

In an optional embodiment, the preset trigger condition includes at least one of the followings: the crosshair enters a first preset range centered on the virtual target; and a preset touch operation acts on a preset trigger control on the graphical user interface. The preset trigger condition is the condition to enable the function of controlling the crosshair by rotating the mobile device. The function may either be enabled when the crosshair enters a certain range (i.e., the first preset range), or be enabled by touching a specific control (i.e., the preset trigger control) by the player. After the function is enabled, the player has one more option to control the crosshair only, and can still control the crosshair by the sliding operation. If the player performs the sliding operation in the crosshair control region while rotating the mobile device, then the movement of the crosshair is controlled preferentially according to the sliding operation. As shown in FIG. 3, both a sphere 6 surrounding a virtual character 5 and a sphere 8 surrounding a virtual character 7 are the first preset ranges. The first preset range may also be other shapes surrounding the virtual characters, and are not limited to spheres. The first preset range is generally invisible, and the spheres shown in the figures are only for the purpose of illustrating the relative positions and specific ranges of the first preset ranges relative to the virtual characters. As shown in FIG. 4, a control 9 is the preset trigger control, which may be clicked by the player to actively trigger the function of controlling the crosshair by rotating the mobile device.

In an optional embodiment, when it is detected that the preset trigger condition is satisfied, a prompt message is issued by at least one of a visual manner, an audible manner, or a tactile manner. In order to prompt the player that the function of controlling the crosshair by rotating the mobile device has been enabled, the prompt message may be sent out by various manners such as a visual manner, an audible manner, or a tactile manner; for instance, displaying a sighting telescope around the crosshair, sending out a text message or an audio message that the function has been enabled, or being accompanied by a vibration alert of the mobile device, or the like. As shown in FIG. 4, when the function of controlling the crosshair by rotating the mobile device is enabled, a sighting telescope control 10 may be generated around the crosshair 4 to prompt the player that the crosshair can be controlled by rotating the mobile device currently.

Figure 2:
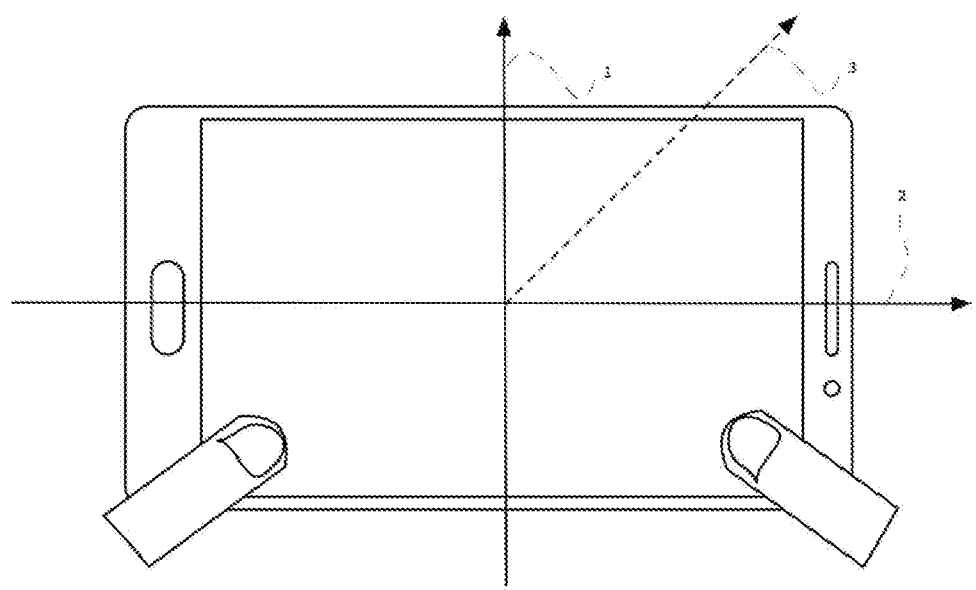
FIG. 2 is a schematic diagram of a mobile device in an exemplary embodiment of the present disclosure.

In step S140, when the sliding touch event does not occur in the crosshair control region, the movement of the crosshair is controlled according to the deflection angle of the mobile device. After the function of controlling the crosshair by rotating the mobile device is enabled, if there is no sliding operation with respect to the crosshair control region, and the player rotates the mobile device, then the movement of the crosshair will be controlled according to the deflection angle of the mobile device. Because the movement of the crosshair in the game scene only has two dimensions of a horizontal dimension and a longitudinal dimension, it is only necessary to control a longitudinal movement of the crosshair according to a deflection angle of the mobile device relative to a horizontal axis, and control a horizontal movement of the crosshair according to a deflection angle of the mobile device relative to a longitudinal axis. In the embodiment as shown in FIG. 2, the player horizontally holds the mobile device while playing games, an axis 1 is the longitudinal axis, an axis 2 is the horizontal axis, and an axis 3 is an axis vertical to a mobile phone screen (this axis is not involved in the present disclosure). The deflection angle relative to the longitudinal axis is the angle of the mobile device being rotated around the axis 1; and the deflection angle relative to the horizontal axis is the angle of the mobile device being rotated around the axis 2. At an initial moment for the player to move the crosshair by rotating the mobile device each time, both the deflection angles of the mobile device relative to the horizontal axis and the longitudinal axis are 0.

The sliding operation has an advantage that a large-range movement of the crosshair can be realized by an action with a small-amplitude, but is difficult to implement a fine adjustment; while controlling the crosshair by rotating the mobile device is easier to achieve a precise operation, and has a strong sense of substitution, but is not convenient for a large-range movement of the crosshair. According to the embodiment, the player can perform coarse adjustment on the crosshair through the sliding operation firstly, and then perform fine adjustment on the crosshair by rotating the mobile device according to the situations, thus quickly and accurately aiming at a shooting target.

In an optional embodiment, a sensitivity of controlling the longitudinal movement of the crosshair is higher or lower than a sensitivity of controlling the horizontal movement of the crosshair. Since the player has different perception degrees on the rotation of the mobile device relative to the horizontal axis and the rotation of the mobile device relative to the longitudinal axis, adaptation can be made by setting different control sensitivities in two dimensions. In general, the sensitivity of controlling the longitudinal movement of the crosshair according to the deflection angle of the mobile device relative to the horizontal axis is lower than the sensitivity of controlling the horizontal movement of the crosshair according to the deflection angle of the mobile device relative to the longitudinal axis.

In an optional embodiment, when it is detected that an absolute value of a change of the deflection angle relative to the horizontal axis is smaller than a first preset value or greater than a second preset value, a currently detected deflection angle is corrected according to two adjacent deflection angles detected successively, the first preset value being greater than 0 and less than the second preset value; and/or, when it is detected that an absolute value of a change of the deflection angle relative to the longitudinal axis is smaller than a third preset value or greater than a fourth preset value, a currently detected deflection angle is corrected according to two adjacent deflection angles detected successively, the third preset value being greater than 0 and less than the fourth preset value. In order to filter unconscious actions (including excessive or too small actions) of the player during the control process, and only respond to initiative and definite control intentions of the player, a maximum value and a minimum value may be respectively set for the absolute value of change of deflection angle of each dimension. When a change of the deflection angle greater than the maximum value or less than the minimum value is detected, the currently detected deflection angle is corrected to smooth a discontinuous rotating control. The first preset value and the second preset value are respectively a minimum value and a maximum value of the change of the deflection angle relative to the horizontal axis, and the third preset value and the fourth preset value are respectively a minimum value and a maximum value of the change of the deflection angle relative to the longitudinal axis. The correction may be performing a linear interpolation according to the two adjacent deflection angles detected successively as the currently detected deflection angle.

In an optional embodiment, the controlling the longitudinal movement of the crosshair according to the deflection angle of the mobile device relative to the horizontal axis may include: when it detected that an absolute value of the deflection angle of the mobile device relative to the horizontal axis is greater than a first critical angle, controlling the longitudinal movement of the crosshair according to the deflection angle relative to the horizontal axis, the first critical angle being greater than 0. The controlling the horizontal movement of the crosshair according to the deflection angle relative to the longitudinal axis may include: when it is detected that an absolute value of the deflection angle of the mobile device relative to the longitudinal axis is greater than a second critical angle, controlling the horizontal movement of the crosshair according to the deflection angle relative to the longitudinal axis, the second critical angle being greater than 0. In some cases, the player only wants to move the crosshair horizontally and does not want to move the crosshair longitudinally. However, the rotation of the mobile device relative to the horizontal axis cannot be completely avoided due to the limitation of the precision of manual control. Therefore, it is possible to set a certain blind zone in each dimension, and rotating the mobile device in the blind zone will not be mapped as the movement of the crosshair. For example, if the blind zone where the mobile device deflects relative to the horizontal axis is set to be 8 degrees (i.e., the first critical angle), when rotating the mobile device, if the absolute value of the deflection angle relative to the horizontal axis is less than 8 degrees, the crosshair will not be controlled to move longitudinally; for another example, if the blind zone where the mobile device deflects relative to the longitudinal axis is set to be 10 degrees (i.e., the second critical angle), when rotating the mobile device, if the absolute value of the deflection angle relative to the longitudinal axis is less than 10 degrees, the crosshair will not be controlled to move horizontally.

In an optional embodiment, a size ratio between the first preset range and the virtual target remains unchanged. The first preset range is centered on the virtual target and will move together with the virtual target. Moreover, when the virtual target is far away from a virtual camera of a game system and becomes smaller in the game scene, the first preset range will also become smaller and the size ratio of them will remain unchanged. In this way, when the virtual target is far away, an opportunity of performing fine adjustment on the crosshair by rotating the mobile device will be correspondingly reduced (because the possibility of satisfying the preset trigger condition will be reduced), and the farther the target is, the more difficult it is to aim, which is consistent with subjective expectations of the player based on general knowledge, and the sense of substitution of the game will become strong. As shown in FIG. 3, the virtual character 5 is closer to the virtual camera and visually appears larger, then the sphere 6, which is the first preset range surrounding the virtual character 5, is also larger. The virtual character 7 is far away from the virtual camera and visually appears smaller, then the sphere 8, which is the first preset range surrounding the virtual character 7, is also smaller.

In an optional embodiment, the method further includes: respectively setting different first preset ranges according to an attribute of the at least one virtual target or an attribute of at least one weapon in the game scene. The trigger condition for enabling the function of controlling the crosshair by rotating the mobile device is the crosshair entering the first preset range, and different ranges mean different aiming difficulties; setting different first preset ranges according to different virtual targets enables different virtual targets to have different aiming difficulties, and setting different first preset ranges according to different weapons enables different weapons to have different control difficulties, thus enriching game experience of the player.

In an implementation manner, the method further includes: when the sliding touch event on the crosshair control region is detected, determining whether the crosshair is located in a second preset range centered on the virtual target; and if the crosshair is located in the second preset range centered on the virtual target, reducing a sensitivity of controlling the movement of the crosshair according to the sliding touch event. The second preset range is a sensitivity adjustment range. After the crosshair enters the range, the sliding sensitivity of controlling the crosshair by the player is reduced. The reduced sensitivity means that displacement of the crosshair in the game scene caused by sliding by a unit distance by the player on the touch screen is reduced, so that the player can finely aim at the virtual target.

In an optional embodiment, a size ratio of the second preset range to the virtual target remains unchanged. The second preset range is centered on the virtual target and will move together with the virtual target. Moreover, when the virtual target is far away from a virtual camera of a game system and becomes smaller in the game scene, the second preset range will also become smaller and the size ratio of the two will remain unchanged. In this way, when the virtual target is far away, an opportunity of performing fine adjustment on the crosshair by reducing the sliding sensitivity will be correspondingly reduced, and the farther the target is, the more difficult it is to aim, which is consistent with subjective expectations of the player based on general knowledge, and the sense of substitution of the game will become stronger.

In an optional embodiment, the method further includes: respectively setting different second preset ranges according to an attribute of the at least one virtual target or an attribute of at least one weapon in the game scene. The trigger condition for performing fine adjustment on the crosshair by reducing the sliding sensitivity is the crosshair entering the second preset range, and different ranges mean different aiming difficulties; setting different second preset ranges according to different virtual targets enables different virtual targets to have different aiming difficulties, and setting different second preset ranges according to different weapons enables different weapons to have different control difficulties, thus enriching game experience of the player.

In an embodiment, the method further includes: when it is detected that the crosshair is located in a third preset range centered on the virtual target, and the crosshair does not move according to the deflection angle of the mobile device or the sliding touch event, controlling the crosshair to follow the virtual target to move, a real-time rate of the crosshair following the virtual target to move being equal to a real-time rate of the virtual target multiplied by a following coefficient, and the following coefficient being greater than or equal to 0, and less than or equal to 1. After the crosshair enters the third preset range of the virtual target, if the player has no active control (including sliding control and control by rotating the mobile device), then the crosshair is controlled to follow the virtual target to move. An optional embodiment is as follows: when the crosshair enters the range, a moving speed of the virtual target is read in real time, and a following speed is applied to the crosshair. A magnitude of the following speed is a magnitude of the moving speed of the virtual target multiplied by a following coefficient, and a direction is a shortest path pointing to an edge of the virtual target. The following coefficient is greater than or equal to 0, and less than or equal to 1. If the following coefficient is greater than 0 and less than 1, then the following speed of the crosshair is smaller than the moving speed of the virtual target. After the crosshair is out of the third preset range, the crosshair will not follow the virtual target to move. In order to give the player enough autonomic control space, when the crosshair is in the third preset range of the virtual target, if the player controls the crosshair by sliding the screen or controls the crosshair by rotating the mobile device, then the following speed applied to the crosshair will be revoked, and the movement of the crosshair is preferentially controlled by the operation of the player. In a state of providing the following movement of the crosshair, if the player does not intend to shoot the virtual target followed by the crosshair, since the following speed of the crosshair is less than the speed of the virtual target, the crosshair will be out of the third preset range within a certain time, and the time is related to the size of the third preset range and the following coefficient.

In an optional embodiment, the method further includes: when it is detected that the crosshair is located at an edge of the virtual target, stopping controlling the crosshair to follow the virtual target to move. The edge here refers to an edge on the virtual target that can be determined to be shot. After the crosshair follows to the edge of the virtual target, the crosshair will not follow the virtual target any longer, so that the player can accurately aim at the target by sliding the screen or rotating the mobile device to determine whether to attack limbs, a head, a trunk or other positions, without directly pulling to a chest of the target like the automatic aiming method in the related art, thus giving the player more space for autonomous control.

In an optional embodiment, a size ratio of the third preset range to the virtual target remains unchanged. The third preset range is centered on the virtual target and will move together with the virtual target. Moreover, when the virtual target is far away from a virtual camera of a game system and becomes smaller in the game scene, the third preset range will also become smaller and the size ratio of the two will remain unchanged. In this way, when the virtual target is far away, an opportunity of performing aiming assistance by following the crosshair will be correspondingly reduced, and the farther the target is, the more difficult it is to aim, which is consistent with subjective expectations of the player based on general knowledge, and the sense of substitution of the game will become stronger.

In an optional embodiment, the method further includes: respectively setting different third preset ranges according to an attribute of the at least one virtual target or an attribute of at least one weapon in the game scene. The triggering condition for providing crosshair following assistance is the crosshair entering the third preset range, and different ranges mean different aiming difficulties; setting different third preset ranges according to different virtual targets enables different virtual targets to have different aiming difficulties, and setting different third preset ranges according to different weapons enables different weapons to have different control difficulties, thus enriching game experience of the player.

In an optional embodiment, the method further includes: respectively setting different following coefficients according to an attribute of the at least one virtual target or an attribute of at least one weapon in the game scene. The larger the following coefficient is, the closer the following speed of the crosshair to the moving speed of the virtual target is, and the longer the time to follow the virtual target is. Different following coefficients mean different aiming difficulties (when the following coefficient is 0, the crosshair does not follow the virtual target; and when the following coefficient is 1, the crosshair follows the virtual target all the time), setting different following coefficients according to different virtual targets enables different virtual targets to have different aiming difficulties, and setting different following coefficients according to different weapons enables different weapons to have different control difficulties, thus enriching game experience of the player.

Figure 5:
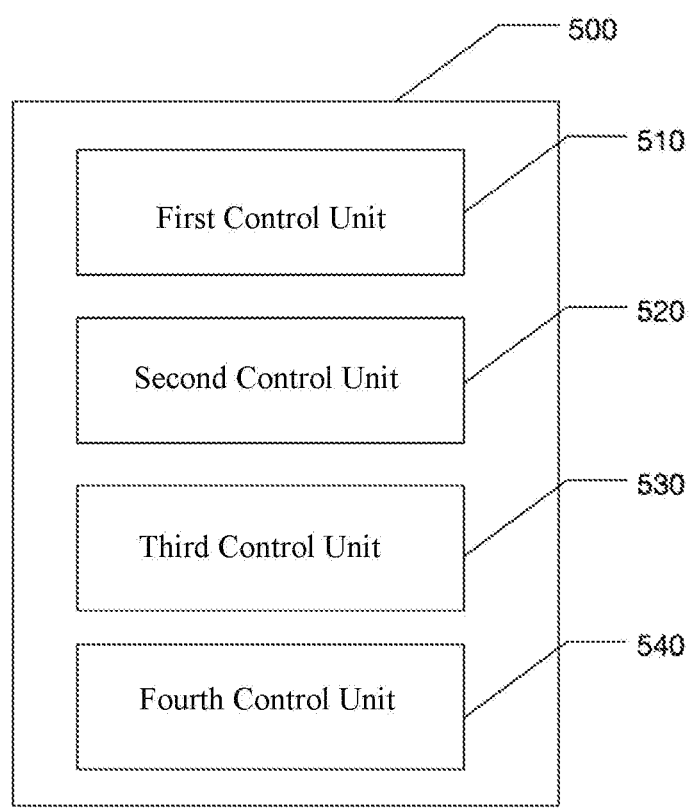
FIG. 5 is a constitutional diagram of an information processing apparatus according to an embodiment of the present disclosure.

In an exemplary embodiment, there is also disclosed an information processing apparatus, applied to a mobile device capable of presenting a graphical user interface, the mobile device including a touch display screen and a sensor capable of detecting a deflection angle of a mobile device, the content displayed on the graphical user interface at least partially including a game scene, and the game scene including at least one virtual target. FIG. 5 is a constitutional diagram of an information processing apparatus according to an embodiment of the present disclosure. As shown in FIG. 5, the apparatus 500 includes: a first control unit 510, a second control unit 520, a third control unit 530, and a fourth control unit 540.

The first control unit 510 is configured to provide a crosshair for aiming at the virtual target and a crosshair control region on the graphical user interface, the crosshair control region being configured to control a movement of the crosshair according to a detected sliding touch event.

The second control unit 520 is configured to, when it is detecting that a preset trigger condition is satisfied, determine whether the sliding touch event occurs in the crosshair control region.

The third control unit 530 is configured to, when the sliding touch event occurs in the crosshair control region, control the movement of the crosshair according to the detected sliding touch event.

The fourth control unit 540 is configured to, when the sliding touch event does not occur in the crosshair control region, control the movement of the crosshair according to the deflection angle of the mobile device.

The specific details of each module unit in the foregoing embodiment have been described in detail in the corresponding information processing method. In addition, the information processing apparatus further includes other unit modules corresponding to the information processing method, and thus will not be elaborated herein.

It should be noted that while a plurality of modules or units of the device for action execution have been mentioned in the detailed description above, this division is not mandatory. In fact, according to the embodiments of the disclosure, the features and functions of the two or more modules or units described above may be embodied in one module or unit. On the contrary, the features and functions of one module or unit described above can be further divided to be embodied by multiple modules or units.

In an exemplary embodiment of the present disclosure, there is also provided a computer readable storage medium storing a computer program thereon, wherein the computer program is executed by a processor to implement the information processing method above.

The computer readable storage medium may include a data signal that is propagated in a baseband or as part of a carrier, in which a readable program code is carried. Such propagated data signal can take a variety of forms including, but not limited to, an electromagnetic signal, an optical signal, or any suitable combination of the foregoing. The computer readable storage medium can transmit, propagate, or transport a program for use by or in connection with an instruction execution system, apparatus, or device.

The program code included in the computer readable storage medium may be transmitted by any suitable medium, including but not limited to wireless, wire, optical cable, radio frequency, etc., or any suitable combination of the foregoing.

In an exemplary embodiment of the present disclosure, there is also provided an electronic device which can implement functions of a terminal. The electronic device includes a processing component, and a display unit, and may further include one or more processors, and memory resources represented by a memory for storing instructions executable by the processing component, such as an application. The application stored in the memory may include one or more modules, each of which is corresponding to a set of instructions. Moreover, the processing component is configured to execute instructions to execute the information processing method described above.

The electronic device may also include: a power component configured to execute power management on the electronic device; a wired or wireless network interface configured to connect the electronic device to a network; and an I/O (Input/Output) interface. An operating system stored in the memory, such as Android, iOS, Windows, Mac OS X, Unix, Linux, FreeBSD or the like, can be operated in the electronic device.

Through the description of the above embodiments, those skilled in the art will readily understand that the example embodiments described herein may be implemented by software or by software in combination with necessary hardware. Therefore, the technical solutions according to the embodiments of the present disclosure may be embodied in the form of a software product which is stored in a not-volatile storage medium (a CD-ROM, a USB disk, a mobile hard disk, etc.) including a number of instructions such that a computing device (which may be a personal computer, a server, an electronic device, or a network device, etc.) performs the methods according to the embodiments of the present disclosure.

Other embodiments of the present disclosure will be apparent to those skilled in the art after taking the description into consideration and practising the invention disclosed herein. This application is intended to cover any variations, uses, or adaptations of the disclosure following the general principles thereof and including such departures from the present disclosure as come within known or customary practice in the art. The description and embodiments are to be regarded as illustrative only, and the real scope and spirit of the present disclosure are pointed out in the claims.

It will be appreciated that the present disclosure is not limited to the exact construction that has been described above and illustrated in the accompanying drawings, and various modifications and changes can be made without departing from the scope thereof. The scope of the disclosure is limited by the appended claims only.

What is claimed is:

1. An information processing method, applied to a mobile device configured for of presenting a graphical user interface, the mobile device comprising a touch display screen and a sensor configured for detecting a deflection angle of the mobile device, a content displayed on the graphical user interface at least partially comprising a game scene, and the game scene comprising at least one virtual target, wherein the method comprises:
   providing a crosshair for aiming at the virtual target and a crosshair control region on the graphical user interface, the crosshair control region being configured to control a movement of the crosshair according to a detected sliding touch event;
   when it is detected that a preset trigger condition is satisfied, determining whether the sliding touch event occurs in the crosshair control region;
   when the sliding touch event occurs in the crosshair control region, controlling the movement of the crosshair according to the detected sliding touch event; and
   when the sliding touch event does not occur in the crosshair control region, controlling the movement of the crosshair according to the deflection angle of the mobile device.

2. The method according to claim 1, wherein the preset trigger condition comprises at least one of the followings:
   the crosshair enters a first preset range centered on the virtual target; and
   a preset touch operation acts on a preset trigger control on the graphical user interface.

3. The method according to claim 1, further comprising: when it is detected that the preset trigger condition is satisfied, sending out a prompt message by at least one of a visual manner, an audible manner, or a tactile manner.

4. The method according to claim 1, wherein the controlling the movement of the crosshair according to the deflection angle of the mobile device comprises:
   controlling a longitudinal movement of the crosshair according to a deflection angle of the mobile device relative to a horizontal axis, and controlling a horizontal movement of the crosshair according to a deflection angle of the mobile device relative to a longitudinal axis.

5. The method according to claim 4, wherein a sensitivity of controlling the longitudinal movement of the crosshair is higher or lower than a sensitivity of controlling the horizontal movement of the crosshair.

6. The method according to claim 4, further comprising at least one of the followings:
   when it is detected that an absolute value of a change of the deflection angle relative to the horizontal axis is smaller than a first preset value or greater than a second preset value, correcting a currently detected deflection angle according to two adjacent deflection angles detected successively, the first preset value being greater than 0 and less than the second preset value; and when it is detected that an absolute value of a change of the deflection angle relative to the longitudinal axis is smaller than a third preset value or greater than a fourth preset value, correcting a currently detected deflection angle according to two adjacent deflection angles detected successively, the third preset value being greater than 0 and less than the fourth preset value.

7. The method according to claim 6, wherein the correcting the currently detected deflection angle according to the two adjacent deflection angles detected successively comprises:

performing a linear interpolation according to the two adjacent deflection angles detected successively, as the currently detected deflection angle.

8. The method according to claim 4, wherein the controlling the longitudinal movement of the crosshair according to the deflection angle of the mobile device relative to the horizontal axis comprises:

when it is detected that an absolute value of the deflection angle of the mobile device relative to the horizontal axis is greater than a first critical angle, controlling the longitudinal movement of the crosshair according to the deflection angle relative to the horizontal axis, the first critical angle being greater than 0.

9. The method according to claim 4, wherein the controlling the horizontal movement of the crosshair according to the deflection angle of the mobile device relative to the longitudinal axis comprises:

when it is detected that an absolute value of the deflection angle of the mobile device relative to the longitudinal axis is greater than a second critical angle, controlling the horizontal movement of the crosshair according to the deflection angle relative to the longitudinal axis, the second critical angle being greater than 0.

10. The method according to claim 2, wherein a size ratio of the first preset range to the virtual target remains unchanged.

11. The method according to claim 2, further comprising: respectively setting different first preset ranges according to an attribute of the at least one virtual target or an attribute of at least one weapon in the game scene.

12. The method according to claim 1, further comprising: when the sliding touch event on the crosshair control region is detected, determining whether the crosshair is located in a second preset range centered on the virtual target; and if the crosshair is located in the second preset range centered on the virtual target, reducing a sensitivity of controlling the movement of the crosshair according to the sliding touch event.

13. The method according to claim 12, wherein a size ratio of the second preset range to the virtual target remains unchanged.

14. The method according to claim 12, further comprising: respectively setting different second preset ranges according to an attribute of the at least one virtual target or an attribute of at least one weapon in the game scene.

15. The method according to claim 1, further comprising: when it is detected that the crosshair is located in a third preset range centered on the virtual target, and the crosshair does not move according to the deflection angle of the mobile device or the sliding touch event, controlling the crosshair to follow the virtual target to move, a real-time rate of the crosshair following the virtual target to move being equal to a real-time rate of the virtual target multiplied by a following coefficient, and the following coefficient being greater than or equal to 0, and less than or equal to 1.

16. The method according to claim 15, further comprising: when it is detected that the crosshair is located at an edge of the virtual target, stopping controlling the crosshair to follow the virtual target to move.

17. The method according to claim 15, wherein a size ratio of the third preset range to the virtual target remains unchanged.

18. The method according to claim 15, further comprising: respectively setting different third preset ranges according to an attribute of the at least one virtual target or an attribute of at least one weapon in the game scene.

19. The method according to claim 15, further comprising: respectively setting different following coefficients according to an attribute of the at least one virtual target or an attribute of at least one weapon in the game scene.

20. An electronic device configured for presenting a graphical user interface, the electronic device comprising a touch display screen and a sensor configured for detecting a deflection angle of the electronic device, a content displayed on the graphical user interface at least partially comprising a game scene, and the game scene comprising at least one virtual target, wherein the electronic device comprises:

a processor; and a memory for storing executable instructions of the processor;

wherein, the processor is configured to:

provide a crosshair for aiming at the virtual target and a crosshair control region on the graphical user interface, the crosshair control region being configured to control a movement of the crosshair according to a detected sliding touch event;

when it is detected that a preset trigger condition is satisfied, determine whether the sliding touch event occurs in the crosshair control region;

when the sliding touch event occurs in the crosshair control region, control the movement of the crosshair according to the detected sliding touch event; and when the sliding touch event does not occur in the crosshair control region, control the movement of the crosshair according to the deflection angle of the electronic device.

21. A non-transitory computer readable storage medium storing a computer program thereon and applied to a mobile device configured for presenting a graphical user interface, the mobile device comprising a touch display screen and a sensor configured for detecting a deflection angle of the mobile device, a content displayed on the graphical user interface at least partially comprising a game scene, and the game scene comprising at least one virtual target, wherein the computer program, when being executed by a processor, performs:

providing a crosshair for aiming at the virtual target and a crosshair control region on the graphical user interface, the crosshair control region being configured to control a movement of the crosshair according to a detected sliding touch event;

when it is detected that a preset trigger condition is satisfied, determining whether the sliding touch event occurs in the crosshair control region;

when the sliding touch event occurs in the crosshair control region, controlling the movement of the crosshair according to the detected sliding touch event; and when the sliding touch event does not occur in the crosshair control region, controlling the movement of the crosshair according to the deflection angle of the mobile device.

* * * * *